Feb. 19, 1963　　　J. F. YATES　　　3,078,126
TRACTION MEMBER FOR VEHICLE WHEEL
Filed Oct. 7, 1960
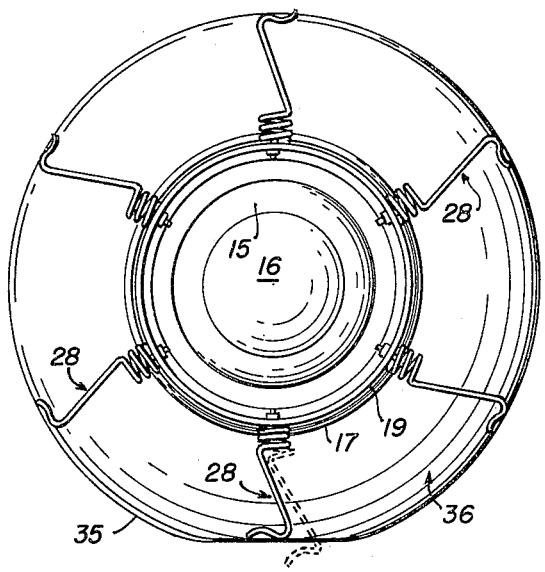
FIG. 1.
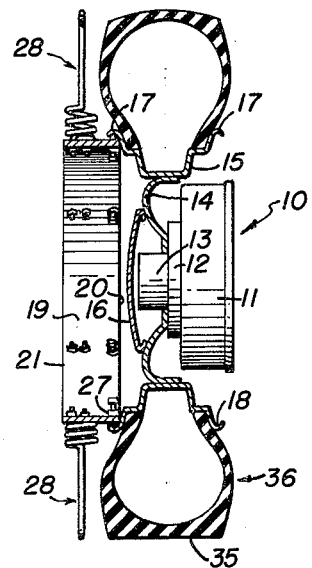
FIG. 2.
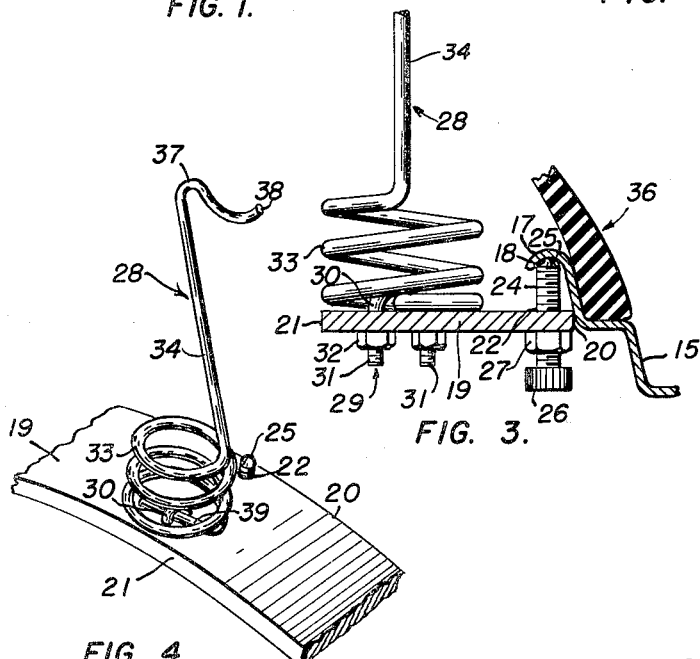
FIG. 3.
FIG. 4.
JAMES FLOY YATES
INVENTOR.
BY Herbert J. Brown
ATTORNEY United States Patent Office 3,078,126
Patented Feb. 19, 1963

3,078,126
TRACTION MEMBER FOR VEHICLE WHEEL
James Floy Yates, 4212 Selkirk Drive W.,
Fort Worth, Tex.
Filed Oct. 7, 1960, Ser. No. 61,155
3 Claims. (Cl. 301—44)

This invention relates to safety accessories for automobile wheels and has reference to a demountable traction member adapted for in place attachment to the wheel of a vehicle while the tire carried by the wheel is in normal contact with the ground.

Although chains have long been used as traction members to permit automobiles parked on ice or packed snow to gain such initial momentum as may be necessary for maneuvering away from the side of a street into traffic lanes, installation of ordinary chains is often difficult under inclement circumstances and may require that the rear end of an automobile be elevated by a manual jack. Manipulation of a bumper jack, such as is standard equipment with many automobiles, may be rendered impossible by the proximity of a car parked immediately behind the car to be driven. In areas subject to only occasional snows and frozen streets and where thawing can be expected to commence in the late morning, chains tend to bruise and damage automobile tires by direct contact with a hard road surface when the car is driven upon a pavement free of snow. Short lengths of chain passing through suitable openings in an automobile wheel and thence around a tire have been used with some success to avoid the necessity of elevating a tire and wheel from the ground for installation, but these devices are limited to use with only those automobile wheels having such suitable openings. Other traction members, allowing installation in place and without elevation but dependent upon clearance between a tire and the ground immediately forward and rearward of the base of the tire, have been constructed; in ice and snow such clearance is not always available or accessible for a wheel nearest the curb.

Accordingly, an object of the present invention is to provide a traction member which may be installed on and attached to an automobile wheel without elevating the wheel and tire from the ground.

Another object of the present invention is to provide a traction member which does not depend for its installation on clearance between a tire and the ground at locations immediately forward and rearward of the base thereof.

A further object of the invention is to provide a traction member for a vehicle and wherein the traction member and an associated tire of the vehicle will not come in contact with or damage one another.

Another object of the invention is to provide a traction member for an automobile which may be attached to an automobile wheel through the use of simple tools and which requires no special skill for its installation.

An additional object of the invention is to provide a traction member which will not damage a paved surface during use on thawed portions of a street or highway.

These and other objects will become apparent from the following description and the accompanying drawing, wherein:

FIGURE 1 is a side elevational view of an automobile wheel and tire having the invention attached thereto.

FIGURE 2 is a partially sectional rear elevational view of the component shown in FIGURE 1.

FIGURE 3 is an enlarged and partially sectional and fragmentary view of components illustrated in FIGURE 2.

FIGURE 4 is a fragmentary perspective view of the invention showing the arrangement of attaching members and traction bodies thereon.

In the drawing, a typical wheel assembly of an automobile is designated generally by the numeral 10 and includes a brake drum 11, lug plate 12, and axle member 13 to which a hub 14 and wheel rim 15 are connected by lugs (not shown). A hub cap 16 is engaged by the hub 14 and encloses the axle member 13 and lugs (not shown) engaging the lug plate 12. Construction of the rim 15 is of particular significance in the present invention and includes perimetrical arcuate flanges 17 which bear against the beads of the casing and are curved away therefrom toward the axis of the wheel to constitute annular pockets or grooves 18. A continuous cylindrical band 19 cut from tube stock or rolled from flat stock and welded at the junction of its opposite ends has inner and outer edges 20 and 21 (with respect to the wheel assembly) which define planes parallel with one another and perpendicular to the axle member 13. A plurality of threaded openings 22 are radially formed through the cylindrical band near the inner edge thereof and are spaced from one another, being symmetrically arranged about the axis of the cylindrical band 19. Bolts 24 are positioned within and threadedly engage the threaded openings 22 in the cylindrical band 19 and each bolt 24 projects radially outward therefrom. The outwardly projecting end 25 of each bolt is rounded and adapted to be received within the arcuate flange 17 on the outer side of the rim 15; the opposite or inwardly projecting end 26 of each bolt 24 is formed as a head having wrench faces and a locking nut 27 is positioned about the bolt threadedly engaging the same between the head 26 thereof and the cylindrical band 19. Near the outer edge 21 of the band 19 a plurality of traction members, generally designated by the numeral 28 are positioned about the exterior surface of the band 19 and are regularly spaced from one another thereon. Each traction member 28 is secured to the band 19 by a U-bolt 29 having its closed portion 30 projecting from the exterior surface of the band and having its opposite threaded ends 31 projecting interiorly of the band. Nuts 32 respectively secure the threaded ends 31 of each U-bolt 29 to the interior surface of the band 19. Each traction member 28 is formed from a single piece of spring steel having a portion thereof formed into a helical spring 33 and having another portion thereof projecting outwardly of the helical spring portion as a flexible spike 34. The combined radial extent of the helical spring portion 33 and flexible spike portion 34 of each traction member 28 is substantially equal to the radial distance between the arcuate flange 17 of the rim 15 and the tread 35 of the tire 36 mounted thereon. The outer portion of each spike 34 is curved forwardly in the direction of rotation of the tire and inwardly toward the axle member 13 to form a heel 37 and the extreme end of each spike is thence formed outwardly to constitute a traction cleat 38. The opposite or inner end of each traction member 28 is formed as a straight stub 39, slightly shorter in length than the diameter of the helical spring portion 33 and disposed tangentially to the band 19 at the outer surface thereof and perpendicularly to the longitudinal axis of the helical spring portion 33 of the traction member 28; the stub 39 is engaged by the U-bolt 29. The inner end of the traction member 28 continues as a flat three-quarter turn equal in diameter to the helical spring portion and thence forms the innermost part of the helical spring portion 33 of the traction member.

For installation, the band 19 is positioned coaxially adjacent the outer arcuate flange 17 of the rim 15 and the bolts 24 are turned until the rounded ends 25 of all bolts are seated and tightened within the groove 18 formed by the flange. The lock nuts 27 are then tightened against the arcuate flange 17 and the traction member is ready for use.

During use of the invention it should be noted that the weight of the vehicle is borne upon the lower part of each tire 36 which is compressed and slightly flattened by the load. As the wheel is turned, the cleat 38 of each traction member 28 is brought into contact with the roadway surface and is imbedded therein; the heel 37 of each traction member, however, prevents deep penetration of the cleat into the roadway surface and prevents damage to the pavement. As momentum is gained and each traction member is carried into contact with the ground, its helical spring is compressed to permit the cleat to maintain its contact with the roadway and to enhance such contact with spring pressure. After the axle member 13 of the wheel has passed beyond a given traction member 28 the heel 37 of that member acts as a fulcrum and the spike portion 34 of the member acts as a lever to disengage the cleat 38 from the roadway and to prevent a braking action by the invention.

The invention is not limited to the exemplary construction herein shown and described, but may be made in various ways within the scope of the appended claims.

What is claimed is:

1. In combination with a wheel having a pneumatic tire mounted thereon and wherein said wheel includes a flange arcuate in cross section providing a radially inwardly opening annular groove around the periphery thereof, a traction member comprising a cylindrical band smaller in diameter than said flange, a plurality of radially directed threaded openings through said band near the inner edge thereof, bolts threadedly received in said openings and engaging the peripheral groove of said flange and radially extending traction means carried by said cylindrical band to a distance slightly less than the normal outside diameter of said pneumatic tire.

2. The construction defined in claim 1 and wherein said radially extending traction means is comprised of spaced elongated flexible members projecting from said cylindrical band.

3. The construction defined in claim 1 and wherein said radially extending traction means is comprised of spaced helical springs projecting from said cylindrical band and having ground engaging spikes on the extending ends thereof.

References Cited in the file of this patent

UNITED STATES PATENTS

| | | |
|---|---|---|
| 1,297,907 | Rand | Mar. 18, 1919 |
| 1,360,921 | Gibney | Nov. 30, 1920 |
| 2,320,331 | Jenewein et al. | May 25, 1943 |
| 2,670,588 | Plant | Mar. 2, 1954 |
| 2,730,406 | Fitsgerald | Jan. 10, 1956 |
| 2,735,723 | Shireman | Feb. 21, 1956 |
| 2,830,847 | Samaras | Apr. 15, 1958 |
| 2,927,760 | Carrigan | Mar. 8, 1960 |
| 2,986,190 | Lamb | May 30, 1961 |

FOREIGN PATENTS

| | | |
|---|---|---|
| 301,963 | Germany | Nov. 20, 1917 |
| 609,364 | Germany | Feb. 13, 1935 |
| 214,443 | Great Britain | Apr. 24, 1924 |